United States Patent [19]

Schoop et al.

[11] Patent Number: 4,632,239
[45] Date of Patent: Dec. 30, 1986

[54] SCRAPER-CHAIN CONVEYOR CHANNEL SECTION

[75] Inventors: Gunther-Dietmar Schoop, Ottmarsbocholt; Franz Roling, Nordkirchen; Dieter Gründken; Manfred Redder, both of Lünen; Hartmut Schewinski, Kamen-Westick; Michael Sauer, Werne-Stockum, all of Fed. Rep. of Germany

[73] Assignee: Gewerkschaft Eisenhutte Westfalia, Fed. Rep. of Germany

[21] Appl. No.: 630,055

[22] Filed: Jul. 12, 1984

[30] Foreign Application Priority Data

Jul. 16, 1983 [DE] Fed. Rep. of Germany ....... 3325794

[51] Int. Cl.[4] .............................................. B65G 19/28
[52] U.S. Cl. .................................................... 198/735
[58] Field of Search ........................................ 198/735

[56] References Cited

FOREIGN PATENT DOCUMENTS

| | | | |
|---|---|---|---|
| 525021 | 12/1953 | Belgium | 198/735 |
| E 6921 | 9/1955 | Fed. Rep. of Germany | 198/735 |
| 1040452 | 10/1958 | Fed. Rep. of Germany | 198/735 |
| 1060784 | 7/1959 | Fed. Rep. of Germany | 198/735 |
| 1250345 | 9/1967 | Fed. Rep. of Germany | 198/735 |
| 1258333 | 1/1968 | Fed. Rep. of Germany | 198/735 |
| 2266644 | 10/1975 | France | 198/735 |
| 467710 | 6/1937 | United Kingdom | 198/735 |
| 1226652 | 3/1971 | United Kingdom | 198/735 |
| 2095195 | 9/1982 | United Kingdom | 198/735 |
| 442309 | 4/1975 | U.S.S.R. | 198/735 |
| 994360 | 2/1983 | U.S.S.R. | 198/735 |

Primary Examiner—Joseph E. Valenza
Assistant Examiner—Michael Stone
Attorney, Agent, or Firm—Sughrue, Mion, Zinn Macpeak & Seas

[57] ABSTRACT

A scraper-chain conveyor is constituted by a plurality of channel sections joined together end-to-end in such a manner as to permit limited articulation therebetween in the horizontal and vertical directions. Each channel section has a pair of side walls connected together by a floor plate. The floor plate of each channel section comprises an upper plate and a lower plate. The lower plates of the channel sections overlap one another, with vertical play, at the interfaces between adjacent channel sections. The upper plates of the channel sections abut one another at said interfaces.

11 Claims, 3 Drawing Figures

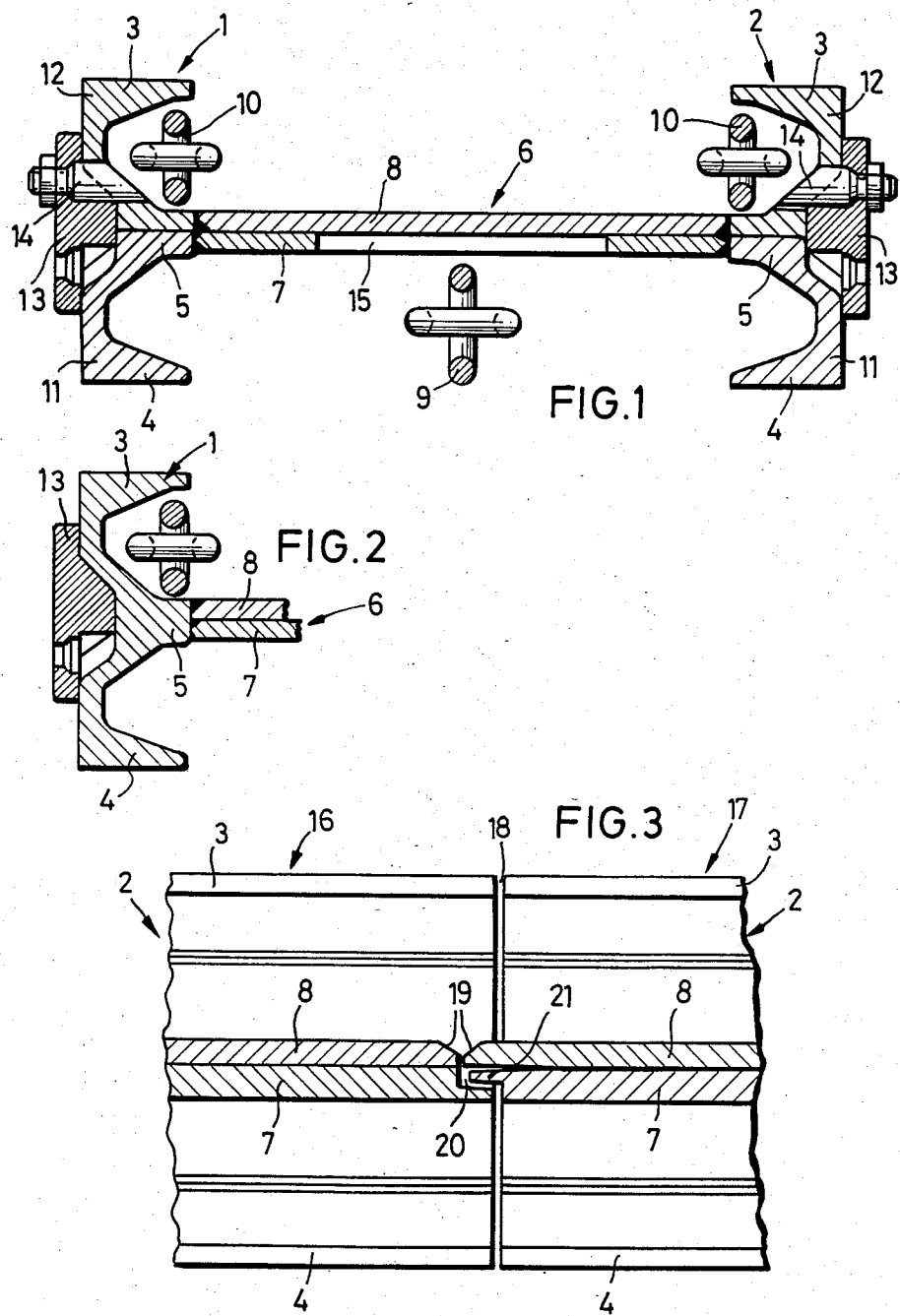

SCRAPER-CHAIN CONVEYOR CHANNEL SECTION

BACKGROUND OF THE INVENTION

This invention relates to a channel section for a scraper-chain conveyor, and to a scraper-chain conveyor constituted by a plurality of channel sections joined together end-to-end.

Known scraper-chain conveyors, which are used primarily in underground mine workings, are constituted by a series of channel sections (or pans), which are connected together in an end-to-end relationship. The channel sections are joined together (for example by means of toggle bolts) in such a manner as to resist tensile forces which tend to draw in the ends of the channel sections apart; whilst permitting some angular mobility, in the vertical and horizontal directions, between the channel section ends. This enables the conveyor to adapt itself to uneven areas of the floor of a mine working, as well as permitting the conveyor to be advanced in sections. Typically, the channel sections have side walls constituted by sections having a generally E- or sigma-shaped profile, a floor plate being welded between the side walls. To prevent the formation of gaps between the floor plates at the channel section interfaces as adjacent channel sections are subjected to relative angling during conveyor advance, through which gaps fine material could pass from the upper run into the lower run, the floor plates are so formed that they overlap at the interfaces. This results, in practice, in the conveyor being able to move material only in one direction (if the scraper assembly of the conveyor was circulated in the opposite direction, the scrapers would have to pass over the overlapping floor plate joints, and this would lead to heavy impact loading and to excessive noise, both of which are undesirable).

It is also known to form the floor plates of the chanel sections as double floor plates which overlap at the interfaces. Alternatively, intermediate plates may be provided to bridge the joints at the interfaces, the intermediate plates being inserted between the double floor plates which are, accordingly, spaced apart (see DE-AS No. 1 275 023 and DE-PS No. 902 236). It is also known to form each of the channel sections from a conveyor tray and a return tray connected thereto. In this case, the conveyor tray can constitute a replaceable wear member (see DE-AS No. 2 254 129, DE-AS No. 1 097 988, DE-PS No. 935 779, DE-AS No. 2 210 897 and DE-OS No. 3 109 329). Unfortunately, all of these arrangements are complicated and costly constructions.

The aim of the invention is to provide a scraper-chain conveyor, and a channel section therefor, which can be made by simple manufacturing methods, which is such that the gap between the floor plates of adjacent channel sections can be sealed off in a reliable manner without the use of special intermediate members, and which permits conveying to take place in both directions.

SUMMARY OF THE INVENTION

The present invention provides a scraper-chain conveyor constituted by a plurality of channel sections joined together end-to-end in such a manner as to permit limited articulation therebetween in the horizontal and vertical directions, each channel section having a pair of side walls connected together by a floor plate, wherein the floor plate of each channel section comprises an upper plate and a lower plate, the lower plates of the channel sections overlapping one another, with vertical play, at the interfaces between adjacent channel sections, and the upper plates of the channel sections substantially abutting one another at said interfaces.

With this conveyor, the gaps between adjacent channel sections are closed, during relative angling, by the overlapping lower floor plates. Since the lower floor plates have adequate motional play at the overlapping zones, the channel sections can deflect freely relatively to each other without the creation of overlapping joints between the upper floor plates, (which overlapping would interfere with travel of the scrapers). The abutting upper floor plates cover the overlapping joints of the lower floor plates, and permit trouble-free passage of the scrapers in both directions of travel of the scraper assembly. It is of advantage in this connection, if the upper plates have bevelled portions at their abutting ends.

Advantageously, the upper plates lie flat on the lower plates, so that reliable support of the upper plates is achieved, while avoiding channel sections having unnecessarily great vertical dimensions.

Preferably, each of the lower plates is welded to the side walls of the respective channel section. Each of the upper plates may also be welded to the side walls of the respective channel section. Alternatively, each of the upper plates is detachably connected to the side walls of the respective channel section. The upper plates can then constitute replaceable wear plates. The upper plates can be designed to be readily replaceable themselves, or they can each be a component of a conveyor tray, which is detachably connected to a return tray which includes the corresponding lower plate. In this case, each channel section is constituted by a return (lower run) tray and a conveyor (upper run) tray which is releasably connected thereto in the known manner. To render the lower run readily accessible for inspection and repair purposes, at least some of the lower plates may be provided with access openings which are covered by the upper plates when the conveyor is in use.

In a preferred embodiment, one end of each lower plate is formed with an upwardly-open recess, and the other end of each lower plate is provided with a tongue whose shape complements that of said recess, the arrangement being such that the tongues engage within adjacent recesses with a predetermined amount of vertical play.

The invention also provides a scraper-chain conveyor channel section comprising a pair of side walls connected together by a floor plate, the floor plate being constituted by an upper plate superposed on a lower plate, wherein one end of the lower plate is formed with an upwardly-open recess, the other end of the lower plate being provided with a tongue of complementary shape to that of said recess, the tongue being adapted to engage in the recess in the lower plate of an adjacent channel section, and wherein the upper plate terminates, at each of the two ends of the channel section, in a blunt edge.

Advantageously, at one end of the channel section, the upper plate projects beyond the adjacent end of the lower plate to overlap the tongue of the lower plate; and, at the other end of the channel section, the upper plate terminates at a portion which is set back from the adjacent end of the lower plate.

BRIEF DESCRIPTION OF THE DRAWINGS

The invention will now be described in greater detail, by way of example, with reference to the accompanying drawings, in which:

FIG. 1 is a transverse cross-section of a conveyor channel section constructed in accordance with the invention;

FIG. 2 is a transverse cross-section of part of a modified form of the conveyor channel section shown in FIG. 1; and, FIG. 3 is a vertical longitudinal cross-section of two adjacent conveyor channel sections of the type shown in FIG. 1.

DESCRIPTION OF PREFERRED EMBODIMENTS

Referring to the drawings, FIG. 1 shows a scraper-chain conveyor channel section having a pair of side walls 1 and 2, each of which has a generally sigma-shaped profile. The side walls 1 and 2 are arranged in a mirror-symmetrical manner in relation to each other, and each has an upper flange 3, a lower flange 4 and an intermediate flange 5. The flanges 3, 4 and 5 of the two side walls 1 and 2 extend towards one another. The intermediate flanges 5 of the two side walls 1 and 2 are interconnected by a conveyor floor plate 6. The floor plate 6 is a double floor plate, being constituted by a lower plate 7 and an upper plate 8 which rests on the lower plate. The floor plate 6 forms part of the conveyor floor along which mineral material (such as coal) is conveyed by the scraper assembly of the conveyor. In the case of a centre chain conveyor, the channel section can be used with a scraper assembly having scrapers (not shown) attached to one (or two) scraper chains 9 (see the bottom of FIG. 1) running in the central zone of the conveyor. Alternatively, in the case of a double outboard chain conveyor, the channel section can be used with a scraper assembly having scrapers (not shown) attached to scraper chains 10 (see the top of FIG. 1) which run in guides formed by the side walls 1 and 2.

As shown in FIG. 1, the two side walls 1 and 2 are of two part construction, being divided in the plane of the floor plate 6. Each side wall 1 and 2 is constituted by two profiled bars 11 and 12, which are interconnected by a connecting bar 13. The profiled bars 11 and 12 each consists of a substantially U-shaped rolled section. Each of the connecting bars 13 extends over substantially the entire length of the channel section, and serves as a reinforcement member. The connecting bars 13 are formed with apertures or pockets into which can be introduced the heads of bolts, by means of which attachments of the usual kind can be secured at the outside of the side walls.

The lower floor plate 7 is welded to the upper flanges of the profiled bars 11 to form what is called a return (or lower run) tray. Similarly, the upper floor plate 8 is welded to the lower flanges of the upper profiled bars 12 to form what is called a conveyor (or upper run) tray. These flanges of the profiled bars 11 and 12 together form the intermediate flanges 5 of the side walls 1 and 2. The conveyor tray constitutes a wear member, and is detachably connected to the return tray so that it can be easily released and replaced. The connection is made by means of horizontal bolts 14, which extend through complementary holes formed in the upper profiled bars 12 and in the connecting bars 13.

The lower floor plate 7 of the channel section is provided with an access opening 15, which is normally covered by the upper flange plate 8 which lies flat on the lower floor plate. After the conveyor tray has been removed, however, the return run of the scraper-chain assembly that is housed in the return tray, is accessible through the openings 15, for example, for inspection and repair.

The modified form of channel section shown in FIG. 2 is identical with that of FIG. 1, except its side walls 1 and 2 are one-part, sigma-shaped rolled sections. Here again, though, a two-part floor plate 6 is welded in between the intermediate flanges 5 of the side walls 1 and 2.

FIG. 3 shows two adjacent channel sections 16 and 17 each of which is of the type shown in FIG. 1. Alternatively, each of the channel sections 16 and 17 could be as shown in FIG. 2. FIG. 3 shows the channel sections 16 and 17 in the zone 18 of their interface. In the zone 18, the ends of the upper floor plates 8, which have bevelled portions 19, almost abut, being separated by a slight gap. The lower floor plates 7 of the two channel sections 16 and 17 seal off this gap. The lower floor plate 7 of the channel section 16 is formed, at that of its ends adjacent to the other channel section 17, with an upwardly-open recess 20. The lower floor plate 7 of the other channel section 17 is provided with an integral tongue 21 which engages within the recess 20. The tongue 21 is shaped to complement the shape of the recess 20, being tapered to follow the tapered contour of the recess. Further, the thickness of the tongue is less than the depth of complementary recess 20, and tongues 21 are set back from the edge of upper floor plate 8 overlying the lower plate 7. Thus, tongue 21 engages within the recess 20 with a limited amount of horizontal and vertical play. In this way, an overlap joint is formed between the lower floor plates 7, which seals off the gap between the upper floor plates 8 in the zone 18, thus preventing fine material from finding its way into the lower run of the conveyor. The play of the tongue 21 in the recess 20 permits limited horizontal and vertical articulation of the channel sections 16 and 17 (which are connected in the usual way by coupling elements such as toggle bolts) without the tongue 21 pushing against the lower surface of the other upper floor plate 8 during vertical articulation. Since the upper floor plates 8 of the channel sections 16 and 17 abut each other at their bevelled ends 19, the scraper assembly of the conveyor can ride freely, in both directions, over the joints between the upper floor plates. It is, therefore, possible to move mineral material in the scraper-chain conveyor, in both directions, in a trouble-free manner.

The lower floor plate 7 of each channel section has a recess 20 at one end and a tongue 21 at the opposite end. The arrangement is such that, at one end of a given channel section, its upper floor plate 8 projects beyond the interface zone 18 and overlies the tongue 21 of the corresponding lower floor plate 7; whereas, at the other end of that channel section, its upper floor plate terminates at a position which is set back from the interface zone.

It will be appreciated that the channel sections described above could be modified. For example, the upper floor plates 8 could be designed as replaceable wear plates. In this case, the upper floor plates 8 would be separately replaceable, that is to say they could be replaced without replacing the corresponding parts of the side walls 1 and 2. Moreover, it would be possible, at each interface zone 18, to change the relative dispositions of the plates 7 and 8, so that each of the joints defined by an overlapped tongue 21 and recess 20 is completely covered by an upper floor plate 8.

We claim:

1. A scraper-chain conveyor comprising a plurality of channel sections joined together end-to-end in such a manner as to permit limited articulation therebetween in the horizontal and vertical directions, each channel section having a pair of side walls connected together by a floor plate, wherein the floor plate of each channel section comprises an upper plate and a lower plate, the lower plates of the channel sections overlapping one another, and means defined by said overlapping lower plates for effecting vertical play between adjacent channel sections, at the interfaces between adjacent channel sections, and the upper plates of the channel sections substantially abutting one another near said interfaces and wherein one end of each lower plate is formed with an upwardly-open recess, and the other end of each lower plate is provided with a tongue projecting outwardly thereof at the top of the lower plate whose shape complements that of said recess, and the depth of the recess being in excess of the thickness of said tongue such that the tongues project within adjacent recesses with a predetermined amount of vertical play.

2. A conveyor according to claim 1, wherein the upper plates have bevelled portions at their abutting ends.

3. A conveyor according to claim 1, wherein the upper plates lie flat on the lower plates.

4. A conveyor according to claim 1, wherein each of the lower plates is welded to the side walls of the respective channel section.

5. A conveyor according to claim 1, wherein each of the upper plates is welded to the side walls of the respective channel section.

6. A conveyor according to claim 1, wherein at least some of the lower plates are provided with access openings which are covered by the upper plates when the conveyor is in use.

7. A scraper-chain conveyor channel section comprising a pair of side walls connected together by a floor plate, the floor plate comprising an upper plate superposed on a lower plate, wherein one end of the lower plate is formed with an upwardly open recess, the other end of the lower plate having a tongue projecting outwardly thereof at the top of the lower plate of complementary shape to that of said recess, said recess being of a depth in excess of the thickness of said tongue, the tongue being adapted to project within the recess in the lower plate of an adjacent channel section and wherein the upper plate terminates, near each of the two ends of the channel sections, in a blunt edge.

8. A channel section according to claim 7, wherein the two ends of the upper plate are bevelled.

9. A channel section according to claim 7, wherein, at one end of the channel section, the upper plate projects beyond the adjacent end of the lower plate to overlap the tongue of the lower plate; and, at the other end of the channel section, the upper plate terminates at a portion which is set back from the adjacent end of the lower plate.

10. A conveyor as claimed in claim 1, wherein the end of the tongue is set back from the edge of the upper floor plate overlying the lower floor plate at said tongue to provide a predetermined amount of horizontal play.

11. A channel section according to claim 10, wherein the end of the tongue carried by said lower plate is set back from the edge of the upper floor plate overlying the lower plate carrying said tongue to provide a perdetermined amount of horizontal play between channel sections near the interface therebetween.

* * * * *